3,538,119
CATALYTIC PROCESS FOR CONVERTING TOCOPHEROL TO TOCOPHERYL MONO SUCCINATE
Peter M. Grant, Penfield, N.Y., assignor to Eastman Kodak Company, Rochester, N.Y., a corporation of Delaware
No Drawing. Filed Dec. 26, 1967, Ser. No. 693,080
Int. Cl. C07d 7/22
U.S. Cl. 260—345.5                             10 Claims

ABSTRACT OF THE DISCLOSURE

A process for producing tocopheryl mono succinate which comprises reacting tocopherol with succinic anhydride in the presence of an alkaline catalyst which is a salt of a weak acid and a strong base. Specific catalysts are sodium acetate, potassium acetate, potassium carbonate, sodium carbonate, calcium acetate, sodium bicarbonate, potassium succinate, and sodium succinate. The reaction temperature can be between 80° and 180° C. for a time between five minutes and four hours, and the catalyst can be present in an amount between .1 and 5% by weight based on the tocopherol-containing composition.

BACKGROUND OF THE INVENTION

Field of the invention

The present invention is a novel catalytic process for preparing the mono succinate (also called hydrogen succinate) of tocopherol by catalytically reacting succinic anhydride with tocopherol.

Description of the prior art

The general reaction between tocopherol and succinic anhydride is well-known, and the most commonly used catalyst has been pyridine as described, for example, in U.S. Pats. 2,350,713, 2,358,046 and in British Pat. 866,489. Pyridine has given good results as far as yield is concerned, but it has been found that addition of an organic solvent and washing with water are necessary to remove the odor of pyridine from the product, as well as undesirable colored materials. This removal, of course, is essential for a product which is to be used in medicines and foods.

SUMMARY OF THE INVENTION

I have found that the disadvantage of using pyridine as a catalyst can be avoided completely, while securing good yields of product, by catalytically reacting tocopherol with succinic anhydride in the presence of an alkaline catalyst (pH greater than 7 in $H_2O$) which is a salt of a weak acid and a strong base. Specific catalysts which I have used successfully are those wherein the cation is an alkali or alkaline earth metal; and particularly successful catalysts have been sodium acetate, potassium acetate, potassium carbonate, sodium carbonate, calcium acetate, sodium bicarbonate, potassium succinate, and sodium succinate. Advantageously the potassium and sodium acetates and carbonates are in an anhydrous condition, preferably freshly fused.

The reaction temperature should be between about 80° and 180° C., and more advantageously between about 120° and 140° C. for the best combination of rapid reaction and stability of reactants. It is advantageous to conduct the heating in the presence of nitrogen or other inert gas, although not necessary if reasonable efforts are taken to restrict access of air to the reactor sufficiently to avoid oxidation of the tocopherols (as by conducting the reaction in a small mouthed reactor vessel).

The time of reaction can be between 5 minutes and 4 hours, but ordinarily a good yield is secured between one and two hours.

The amount of catalyst used can be between about .1 and about 5% by weight based on the composition containing the tocopherol, but between 1 and 2% is particularly advantageous for rapid reaction.

Tocopheryl succinate is later recovered as product by dissolving the ester from the reaction mixture into an organic solvent, filtering, and crystallizing the ester from the filtrate.

In my novel process the catalysts are eliminated, upon subsequent recovery of the tocopheryl succinate product, by remaining in the filter cake along with excess succinic anhydride, while the ester in solution passes through as filtrate.

Tocopherols naturally occur as mixtures in many, if not all, of the vegetable oils. Such mixtures also occur in some animal oils, but to a lesser extent. My invention is of general application to tocopherol concentrates produced from all such natural sources. It is also applicable to mixtures of alpha and other tocopherols which can be prepared synthetically.

My invention is of particular value in connection with the separation of tocopherols present in scum produced during the deodorization treatment of vegetable or animal oils. Such scum, also known as deodorizer sludge, is obtained by condensing the steam or like carrier gas utilized during the vacuum deodorization of vegetable and animal oils. The steam used in the deodorization treatment carries over volatile matter which contains a quite high content of tocopherols.

This product can be directly treated in accordance with my invention, but it is preferred that it be subjected to a concentration procedure designed to increase the tocopherol concentration. Thus, the scum may be subjected to high vacuum unobstructed path distillation, and a tocopherol fraction of high concentration separated. On the other hand, the scum may be saponified and the nonsaponifiable treated in accordance with my invention. Alternatively, the starting material may be obtained by saponification of the natural oil itself, according to known manner. Regardless of the source of the mixed tocopherol starting material, I can operate on a tocopherol concentrate starting material which contains as little as 5% or less tocopherols, but desirably at least 15% and up to 90–100% of mixed tocopherols (alpha, gamma, beta, or delta), all by weight. Reference is made to Hickman Pat. 2,349,269, issued May 23, 1944, for a more detailed description of the various methods of preparing tocopherol concentrates from deodorizer scum.

In addition, the principles of the invention apply to both d- and dl-tocopherols, the former being normally secured from natural sources and the latter being synthetic tocopherol.

Tocopherol concentrates are complex mixtures, with the impurities believed to be mainly esters of unknown identity, plus sterols, acids and long-chain hydrocarbons.

In the following description Emmerie and Engel values (called E and E values for brevity) are used to denote the amounts of unesterified tocopherol present. The Emmerie and Engel analysis method is described in Rec. tran. chim. phys. Pays-Bas, vol. 58, page 283 (1939), and also in U.S. Pharmacopeia XVII, page 889. The lower the E and E value, the higher is the amount of tocopheryl succinate and the lower the amount of unesterified tocopherols in the reaction mixture.

DESCRIPTION OF THE PREFERRED EMBODIMENTS

The following examples provide details of my novel process:

Example 1—(no catalyst)

60 grams of a tocopherol concentrate containing 840 mg./g. total tocopherols, of which 787 mg. are alpha tocopherol, is stirred with succinic anhydride at 140° C. for 2 hours. The product has an E and E value of 591 mg./g., showing that little reaction has occurred.

Example 2—(Potassium acetate)

Anhydrous potassium acetate is fused in a crucible and then is promptly used, while still anhydrous, by mixing 1 gram (1.66% of the weight of concentrate) with 60 grams of the tocopherol concentrate of Example 1, and with 29 grams of succinic anhydride, and stirring at 140° C. for two hours. The E and E value of the reaction product is only 3.3 mg./g.

A sample of the reaction product is water washed from ether solution, and 82% of the reaction product is recovered in the ether layer. The ether soluble fraction contains 90.8% alpha tocopheryl mono succinate.

A 20 gram portion of the reaction product is added to 100 ml. of petroleum ether, warmed and filtered. Alpha tocopheryl succinate is crystallized from the filtrate, and then recrystallized from petroleum ether to provide 12.2 grams of white tocopheryl succinate crystals having a melting point of 76° C. and an ultra violet absorption spectrum E (1%, 1 cm.) (283 m$\mu$)=39.1 in ethanol, representing a yield of 89% alpha tocopheryl succinate.

Example 3—(Sodium acetate)

60 grams of the tocopherol concentrate of Example 1 is mixed with 29 grams of succinic anhydride and 1 gram of sodium acetate (1.66% of the weight of concentrate), and stirred at 140° C. for 2 hours. The E and E value after 1 hour is 27 mg./g., and after 2 hours is 16 mg./g. A portion of the reaction product is water washed from either, recovering 78% in the ether layer. Analysis of the ether soluble fraction shows 90.3% alpha tocopheryl mono succinate.

20 grams of the reaction product is dissolved in petroleum ether and filtered. 12.7 grams of alpha tocopheryl mono succinate crystallizes from the filtrate as in Example 2, having a melting point of 77° C. and an E (1%, 1 cm.) (283 m$\mu$)=38.2 in ethanol, representing a 92% yield.

Example 4—(Potassium acetate)

60 grams of the tocopherol concentrate of Example 1 is mixed with 29 grams of succinic anhydride and 0.3 gram of potassium acetate (0.5% of the weight of concentrate) and stirred at 125° C. for 2 hours. The E and E value after 1 hour is 16 mg./g. and after 2 hours is 13 mg./g. A portion of the reaction product is water washed from ether, recovering 82.8% in the ether layer. The ether soluble fraction analyzes 90.3% alpha tocopheryl mono succinate.

20 grams of the reaction product is dissolved in warm petroleum ether and filtered. 12.1 grams of alpha tocopheryl mono succinate crystallizes from the filtrate, having a melting point of 76.5° C., and an E (1%, 1 cm) (283 m$\mu$) of 38.7 in ethanol, representing an 88% yield of alpha tocopheryl mono succiniate.

Examples 5–9

30 grams of alpha tocopherol concentrate, as described in Example 1, is reacted with 14.5 grams of succinic anhydride and 1 gram of the catalyst named below while stirring at 140° C. for 2 hours. E and E values are given after 1 hour and 2 hours.

A 20 gram portion of the reaction product is dissolved in petroleum ether and filtered, and alpha tocopheryl mono succinate is crystallized from the filtrate as described in Example 2. The results are set forth in Table I below. E values are (1%, 1 cm.) (283 m$\mu$) in ethanol. Yield is of d alpha tocopheryl succinate.

TABLE I

| Ex. | Catalyst | E and E values 1 hour | E and E values 2 hours | E of product | Yield, percent |
|---|---|---|---|---|---|
| 5 | None | | 530 | | None |
| 6 | KCO$_3$ | 19 | 13 | 37.6 | 95 |
| 7 | Na$_2$CO$_3$ | 231 | 43 | 38.7 | 92 |
| 8 | NaHCO$_3$ | 256 | 59 | 38.8 | 89 |
| 9 | Na succinate | 304 | 72 | 38.5 | 87 |

Examples 10–22

In all of the following examples the following procedure is followed:

60 grams of tocopheryl concentrate (870 mg./g. tocopherols; 800–850 alpha) is reacted with 29 grams of succinic anhydride in the presence of the specified percent of catalyst (based on concentrate) while stirring at the specified temperature for the specified number of hours in a nitrogen atmosphere.

The reaction mixture is cooled to 70° C. and petroleum ether added, after which the mixture is filtered to remove catalyst and excess succinic anhydride in the filter cake.

The product is crystallized from the filtrate by cooling it and filtering out the d alpha tocopherol crystals. The following Table II shows the results obtained with the various catalysts named.

TABLE II

| Ex. | Catalyst | Time (hrs.) | Temp. (° C.) | E and E (mg./g.) | E of Product | Yield (percent) |
|---|---|---|---|---|---|---|
| 10 | Pyridine (.66%) | 3 | 125 | 13 | 38.2 | 83.4 |
| 11 | Pyridine (0.8%) | 2 | 135 | 16.1 | 38.0 | 85.3 |
| 12 | Ca (C$_2$H$_3$O$_2$)$_2$ (1.7%) | 4 | 140 | 88 | 38.1 | 52.0 |
| 13 | Na C$_2$H$_3$O$_2$ (0.8%) | 2 | 130 | 22 | 38.5 | 89.7 |
| 14 | K$_2$CO$_3$ (1.7%) | 2 | 140 | 35.2 | 37.7 | 91.0 |
| 15 | K$_2$CO$_3$ (1.7%) | 2 | 125 | 22 | 38.2 | 83.3 |
| 16 | KC$_4$H$_4$O$_4$ (0.8%) | 4 | 125 | 40 | 38.4 | 67.7 |
| 17 | KC$_4$H$_4$O$_4$ (0.8%) | 2 | 135 | 28.6 | 38.2 | 90.0 |
| 18 | KC$_4$H$_4$O$_4$ (1.7%) | 2 | 125 | 21 | 38.3 | 93.0 |
| 19 | KC$_4$H$_4$O$_4$ (1.7%) | 2 | 135 | 12 | 37.8 | 93.3 |

Example 20—(Mixed catalysts)

95 grams of the tocopherol concentrate of Examples 10–19 are mixed with 27 grams of succinic anhydride, 1 gram of potassium succinate and 0.5 gram of potassium acetate (1.6% together), and stirred at 123° C. for 3.75 hours. The E and E value is 20 mg./g. The yield of alpha tocopheryl succinate is better than 90% upon crystallization from petroleum ether as described in the previous examples.

From the foregoing results it can be seen that there has been provided a novel process for preparing essentially odor-free tocopheryl succinate crystals of excellent whiteness in excellent yield. Furthermore, the catalysts used are not subject to the disadvantage of pyridine in that they do not provide any undesirable odor which must be eliminated from the product before it can be used in food or medicine. It is particularly notable that odor-free and color-free products are secured without the need for maintaining reducing conditions such as might be provided by a hydrogen atmosphere, whether or not generated in situ.

The invention has been described in detail with particular reference to preferred embodiments thereof, but it will be understood that variations and modifications can be effected within the spirit and scope of the invention as described hereinabove and as defined in the appended claims.

I claim:

1. In a process for producing tocopheryl mono succinate which comprises reacting tocopherol with succinic anhydride, the improvement of employing an alkaline catalyst which is a salt of a weak acid and a strong base.

2. In a process in accordance with claim 1, said strong base being alkali or alkaline earth metal.

3. In a process in accordance with claim 1, said catalyst being at least one substance selected from the group consisting of sodium acetate, potassium acetate, potassium carbonate, sodium carbonate, calcium acetate, sodium bicarbonate, potassium succinate, and sodium succinate.

4. In a process in accordance with claim 1, said reacting being at a temperature between about 80 and about 180° C.

5. In a process in accordance with claim 1, said catalyst being present in an amount between about .1 and about 5% by weight based on the composition containing said tocopherol.

6. In a process in accordance with claim 1, said catalyst being potassium acetate.

7. In a process in accordance with claim 1, said catalyst being sodium acetate.

8. In a process in accordance with claim 3, said reacting being at a temperature between about 120 and about 140° C. for between 5 minutes and 4 hours, and said catalyst being present in an amount between 1 and 2% by weight based on the composition containing said tocopherol.

9. In a process in accordance with claim 8, said tocopherol being principally d alpha tocopherol.

10. In a process in accordance with claim 1, the additional step of recovering tocopheryl succinate from the reaction mixture as a crystalline product.

References Cited

UNITED STATES PATENTS

| 2,350,713 | 6/1944 | Baxter et al. | 260—345.5 |
| 2,358,046 | 9/1944 | Baxter et al. | 260—345.5 |
| 2,680,749 | 6/1954 | Cawley et al. | 260—345.5 |
| 3,459,774 | 8/1969 | Nakamura et al. | 260—345.5 |

OTHER REFERENCES

Baxter et al.: J. Am. Chem. Soc., vol. 65, pp. 918–24 (1943).

HENRY R. JILES, Primary Examiner

J. M. FORD, Assistant Examiner

U.S. Cl. X.R.

99—11; 260—999